United States Patent [19]

Wells

[11] Patent Number: 5,218,767
[45] Date of Patent: Jun. 15, 1993

[54] FLUID POWERED CUTTING TOOL

[76] Inventor: Andrew J. Wells, 6257 Star La. NW., Bemidji, Minn. 56601

[21] Appl. No.: 864,425

[22] Filed: Apr. 6, 1992

[51] Int. Cl.⁵ .............................................. B26B 7/00
[52] U.S. Cl. .................................... 30/277.4; 30/392; 74/110
[58] Field of Search .................. 30/277.4, 392, 272.1; 173/101, 114, 122, 162.1; 74/110; 92/138, 140

[56] References Cited

U.S. PATENT DOCUMENTS

| | | | |
|---|---|---|---|
| 1,704,641 | 3/1930 | Weed | 30/392 |
| 2,619,721 | 12/1952 | King | 30/392 |
| 2,808,083 | 10/1957 | Miller | 30/392 |
| 3,155,011 | 11/1964 | Hyskell | 30/392 |
| 3,192,972 | 7/1965 | Tenney | 30/392 |
| 3,745,842 | 7/1973 | Brems | 74/110 |
| 3,832,772 | 9/1974 | Sumida | 30/392 |
| 3,945,304 | 3/1976 | Taylor | 74/110 |
| 4,884,341 | 12/1989 | Baertlien | 30/277.4 |

FOREIGN PATENT DOCUMENTS

| | | | |
|---|---|---|---|
| 4028579 | 7/1992 | Fed. Rep. of Germany . | |
| 1129935 | 1/1957 | France | 30/392 |

*Primary Examiner*—Frank T. Yost
*Assistant Examiner*—Hwei-Siu Payer
*Attorney, Agent, or Firm*—Burd, Bartz & Gutenkauf

[57] ABSTRACT

A balanced essentially vibration-free hand-grippable fluid powered reciprocating blade cutting tool intended primarily for cutting poultry, fish and meat for processing. The tool includes a hollow handle which functions as a motor housing. Fittings are provided for connecting the housing to a source of fluid under pressure and for exhausting fluid from the housing. A reciprocable cutting blade extends forwardly from the handle. A fluid actuated motor within the handle housing includes a pair of aligned piston assemblies of approximately equal weight. The pistons are reciprocable in opposite directions. The cutting blade is secured to one of these pistons. A control valve and fluid flow passages within the housing and associated with the fluid inlet fitting permits fluid to be directed alternately to the inner and outer sides of the pistons for causing the pistons to alternately move toward one another and away from one another. A manually operable trigger controls the flow of fluid into the housing. The angle of the cutting blade relative to the handle is variable to further reduce fatigue and other problems associated with rotation of the wrist, which is a contributing cause of carpal tunnel syndrome.

20 Claims, 5 Drawing Sheets

FLUID POWERED CUTTING TOOL

BACKGROUND OF THE INVENTION

1. Field of the Invention

This invention is directed to a hand-grippable fluid powered cutting tool. More particularly the invention is directed to a hand-grippable fluid powered reciprocating blade knife. Although designed for and intended primarily for use as a knife for dismemberment of poultry, meat and fish into parts for processing, the tool may obviously be used for other cutting operations requiring repeated and fatiguing operation of a knife or saw or the like. Powered tools available for these purposes are subject to vibration which contributes significantly to fatigue. The fluid powered tool of the present invention has the advantage of being virtually vibration-free.

2. Prior Art

The following United States patents, all relating to reciprocating saw blades, are exemplary of the prior art:

Weed U.S. Pat. No. 1,704,641, Mar. 5, 1930,
King U.S. Pat. No. 2,619,721, Dec. 2, 1952,
Miller U.S. Pat. No. 2,808,083, Oct. 1, 1957,
Hyskell U.S. Pat. No. 3,155,011, Nov. 3, 1964, and
Sumida U.S. Pat. No. 3,832,772, Sep. 3, 1974.

The Miller, Weed and Hyskell patents show means for reciprocating a saw blade by means of a single piston. The King patent discloses an air actuated motor for reciprocating a saw blade. The Sumida patent utilizes air to drive a rotory motor whose rotory action is converted to linear reciprocating action.

SUMMARY OF THE INVENTION

Broadly stated, the hand-grippable fluid powered reciprocating blade cutting tool according to the present invention comprises a hollow handle which functions as a motor housing. Fitting means are provided for connecting the housing to a source of fluid under pressure and for exhausting fluid from the housing. A reciprocable cutting blade extends forwardly from the handle. A fluid actuated motor within the handle housing includes a pair of aligned spaced apart pistons of approximately equal weight which are reciprocable in opposite directions. The cutting blade is secured to one of these pistons. A control valve and fluid flow passages within the housing and associated with the fluid inlet fitting permits fluid to be directed alternately to the inner and outer sides of the pistons for causing the pistons to alternately move toward one another and away from one another. Manually operable trigger means control the flow of fluid into the housing.

The angle of the cutting blade relative to the handle is variable to further reduce fatigue and other problems associated with rotation of the wrist, which is a contributing cause of carpal tunnel syndrome.

BRIEF DESCRIPTION OF THE DRAWINGS

The invention is illustrated in the accompanying drawings in which corresponding parts are identified by the same numerals and in which:

FIG. 8 is a rear elevation shown with the handle end cap or cover removed;

DETAILED DESCRIPTION OF THE DRAWINGS

Referring now to the drawings, and particularly to FIGS. 1 through 4, there is shown a fluid powered reciprocable blade cutting tool according to the present invention. The tool comprises a hollow handle, indicated generally at 10, of a size and shape readily grippable by a hand, and a reciprocable blade, indicated generally at 11. Blade 11 may be a knife blade, as shown, or a saw blade, or the like. Although material is not critical, handle 10 may be formed, for example, by casting and machining aluminum, or the like. Blade 11 is formed from high quality steel capable of receiving and holding a sharp edge, whether smooth or serrated.

Preferably, for safety, and to minimize fatigue, the top edge of the handle is provided with a front hand rest 12, and a thumb rest 13, here shown as projecting from the left hand side of the handle for right handed use. Desirably a plurality of longitudinal finger grip grooves 14 are provided in the opposite sides and bottom of the handle.

A finger guard 15 of area greater than the cross section of handle 10 is secured to the front end of the handle, as by screws as shown. Finger guard 15 may desirably be formed from any of a plurality of rigid synthetic resinous plastic materials, preferably having lubricating properties. Exemplary resins include polypropylene, nylon, acrylonitrile-butadiene-styrene (ABS), and acetal resins, such as sold by duPont under the trademark DELRIN.

Figure 1:
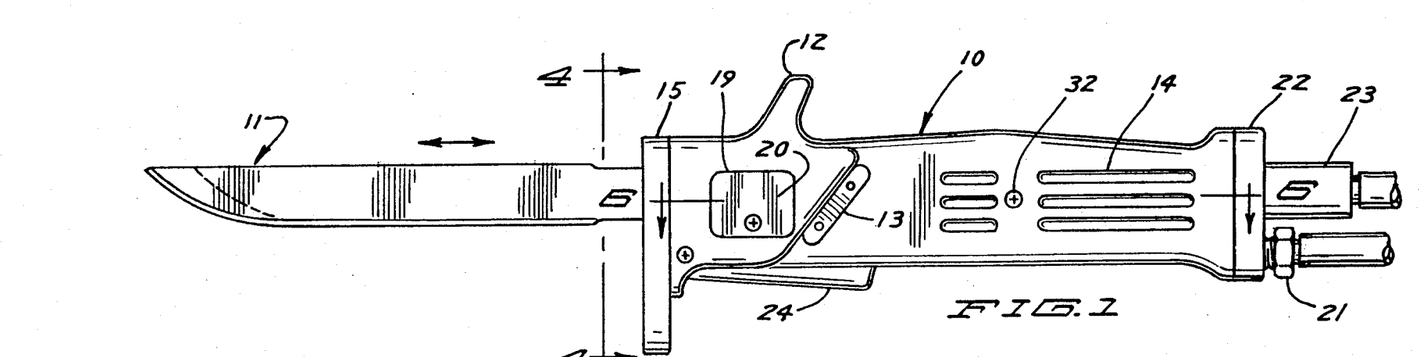
FIG. 1 is a left side elevation of the fluid powered cutting tool according to the present invention, here shown as a knife.
Figures 2, 3, 4:
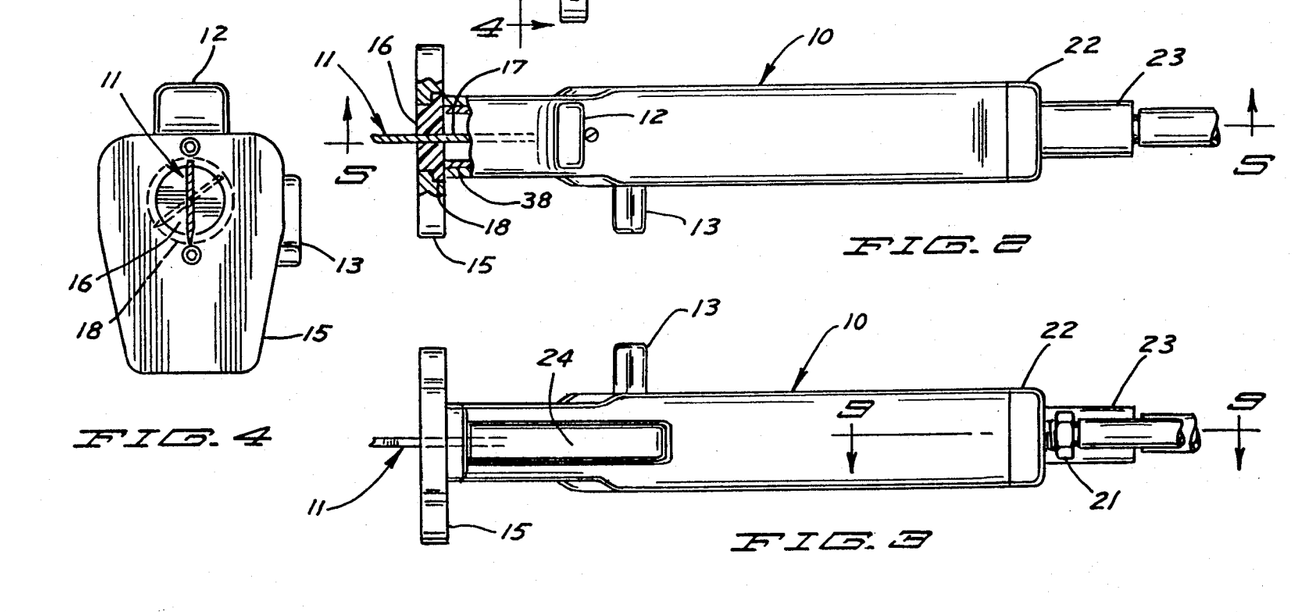
FIG. 2 is a top view thereof, partly in section.
FIG. 3 is a bottom view thereof.
FIG. 4 is a front elevation, partly in section along the line 4—4 of FIG. 1 and in the direction of the arrows.

As best seen in FIGS. 2 and 4, a circular washer 16 is positioned in an opening in finger guard 15. The shank 17 of blade 11 extends through the washer. A flange 18 on the back side of washer 16 engages a complementary annular shoulder on the back side of finger guard 15. As explained hereinafter, the angle of blade 11 may be varied with corresponding rotation of washer 16. The washer is preferably formed from the same plastic material as the finger guard. A port 19 is provided in the side of the handle to provide access to secure blade shank 17 to the fluid powered motor, as explained hereinafter. A plate 20 covers that port.

Figures 5, 6:
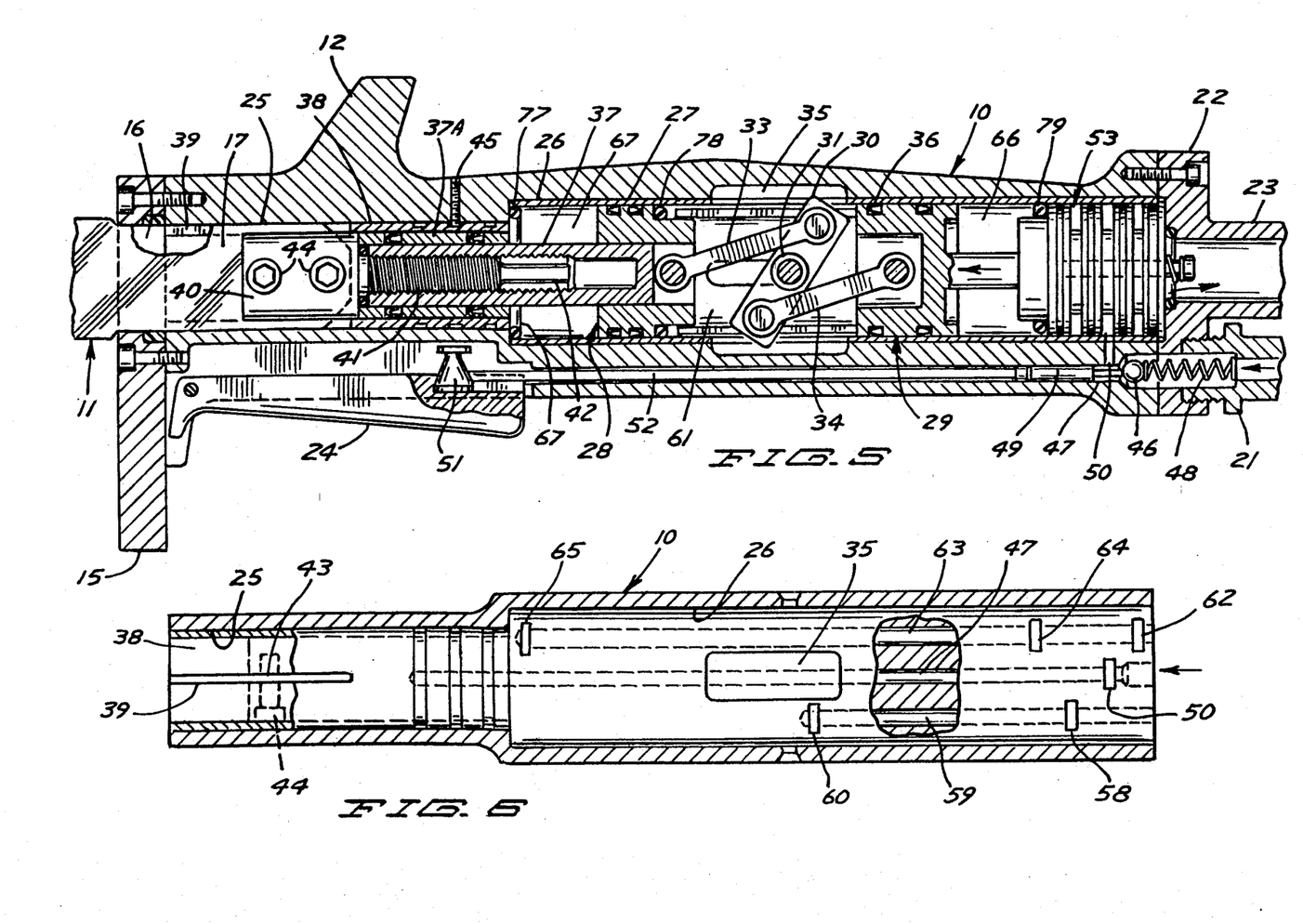
FIG. 5 is a longitudinal vertical section, on a somewhat enlarged scale, on the line 5—5 of FIG. 2 and in the direction of the arrows, showing the parts with the cutting blade retracted.
FIG. 6 is a similar longitudinal horizontal section of the handle housing, with motor parts omitted, on the line 6—6 of FIG. 1 and in the direction of the arrows.
Figures 6, 7, 7A:
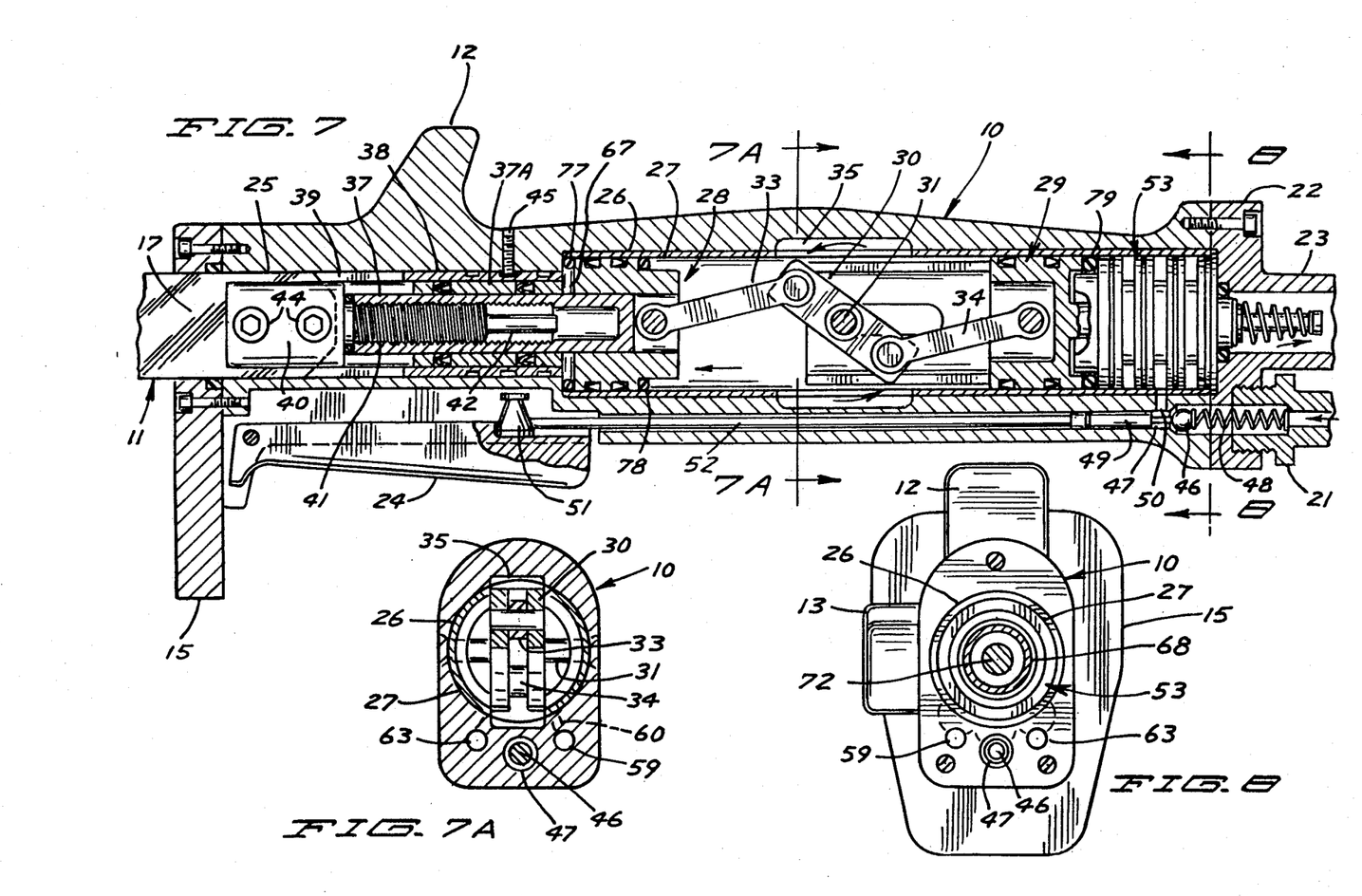
FIG. 7 is a sectional view similar to FIG. 5 but showing the parts with the cutting blade extended.
FIG. 7A is a transverse vertical section on the line 7A—7A of FIG. 7 and in the direction of the arrows.

An inlet fitting 21 adapted for connection to a source of fluid under pressure is provided in rear cover or cap 22 at the end of the handle. Similarly exhaust means 23 are provided for discharging fluid from the housing. Flow of fluid into the housing is controlled by means of trigger 24. As best seen in FIGS. 5 and 7, trigger 24 is pivotally supported by a transverse pin in a longitudinal slot in the bottom of the handle.

The power tool of the present invention is operated by fluid pressure. Preferably the fluid is a gas under pressure and preferably the gas is air. However, liquids as are commonly used in hydraulically operated equipment may optionally be used. Especially for food processing operations, pneumatic power is preferred to minimize the possibility of contamination of the food products.

Referring now to FIGS. 5 through 10, the handle housing has a forward cylindrical bore 25 and a rearward cylindrical bore 26 of slightly larger diameter. Bore 26 is preferably provided with a cylindrical tight fitting stainless steel sleeve 27. The fluid powered motor includes a forward or primary piston, indicated generally at 28, and a rearward or secondary piston indicated generally at 29, which functions as a balancing counterweight for piston 28 to eliminate vibration. Pistons 28 and 29 are preferably connected by a pivoted linkage.

As shown, the pivoted linkage between the pistons includes a linkage arm 30 journaled for limited rotation about a fixed transverse horizontal shaft or pin 31 secured in the housing by fluid tight screws 32. A link 33 is pivotally attached at one end to primary piston 28 and at the other end to one end of linkage arm 30. Similarly a link 34 is pivotally attached at one end to the opposite end of linkage arm 30 and pivotally connected at its other end to secondary piston 29. A recess 35 accessable through an opening in sleeve 27 is provided to permit room for rotation of linkage arm 30. Both pistons are in fluid tight slideable engagement with sleeve 27. Fluid tight sealing engagement is preferably provided by U-cup piston rings 36.

A forwardly extending internally threaded piston rod 37 is fixed to piston 28 and slideably engages a plurality of aligned bushings 37A held fixed in the bore of sleeve 38 within bore 25. The forward end of sleeve 38 is slotted at 39 to receive the shank 17 of blade 11. A cylindrical blade mounting shaft 40 slideably engages the bore of sleeve 38. Shaft 40 has a rearwardly extending externally threaded shank 41 which is engageable with internally threaded piston rod 37 to connect the cutting blade to piston 28 for reciprocable movement therewith. Shank 41 has a rearward extension 42 available for balancing the primary piston and blade assembly relative to the secondary piston, as explained hereinafter.

Blade mounting shaft 40 has a longitudinal slot 43 (FIG. 6) in alignment with slot 39 of sleeve 38 to receive the shank 17 of the cutting blade 11. The cutting blade is rigidly held in the mounting shaft by means of a pair of screws 44. The blade mounting shaft is accessable through port 19 for the purpose of installing or replacing blades.

Sleeve 38 is held fixed in handle bore 25 by means of a set screw 45. When screw 45 is loosened sleeve 38 along with the cutting blade and blade mounting shaft 40 may be rotated to position the blade at whatever angle is most convenient and comfortable for the operator using the knife. The blade assembly may be rotated through a full 360° so as to accommodate the needs of both right handed and left handed operators and whatever cutting stroke a particular operation requires. Because of the threaded connection between the blade assembly and piston 28, the blade assembly may be rotated while the position of the piston remains unchanged.

Flow of fluid under pressure through fitting 21 is controlled by trigger 24. A ball valve element 46 seats in the rearward end of longitudinal passage 47 biased in the closed position by coil spring 48. A pin 49 in fluid tight slideable engagement with passage 47 dislodges the ball valve element 46 when trigger 24 is squeezed to permit flow of fluid into the housing through port 50. Trigger 24 is provided with a conical element 51 which engages the beveled end of a elongated push rod 52 positioned in loose slideable engagement with passage 47. The beveled end of the push rod is maintained in engagement with cone 51 by spring 48. When the trigger is squeezed push rod 52 and pin 49 are moved rearwardly a short distance sufficient to dislodge valve element 46 from its normally seated position. The flat end of cone 51 engages the end of push rod 52 to retain the trigger in operative position.

Figure 9:
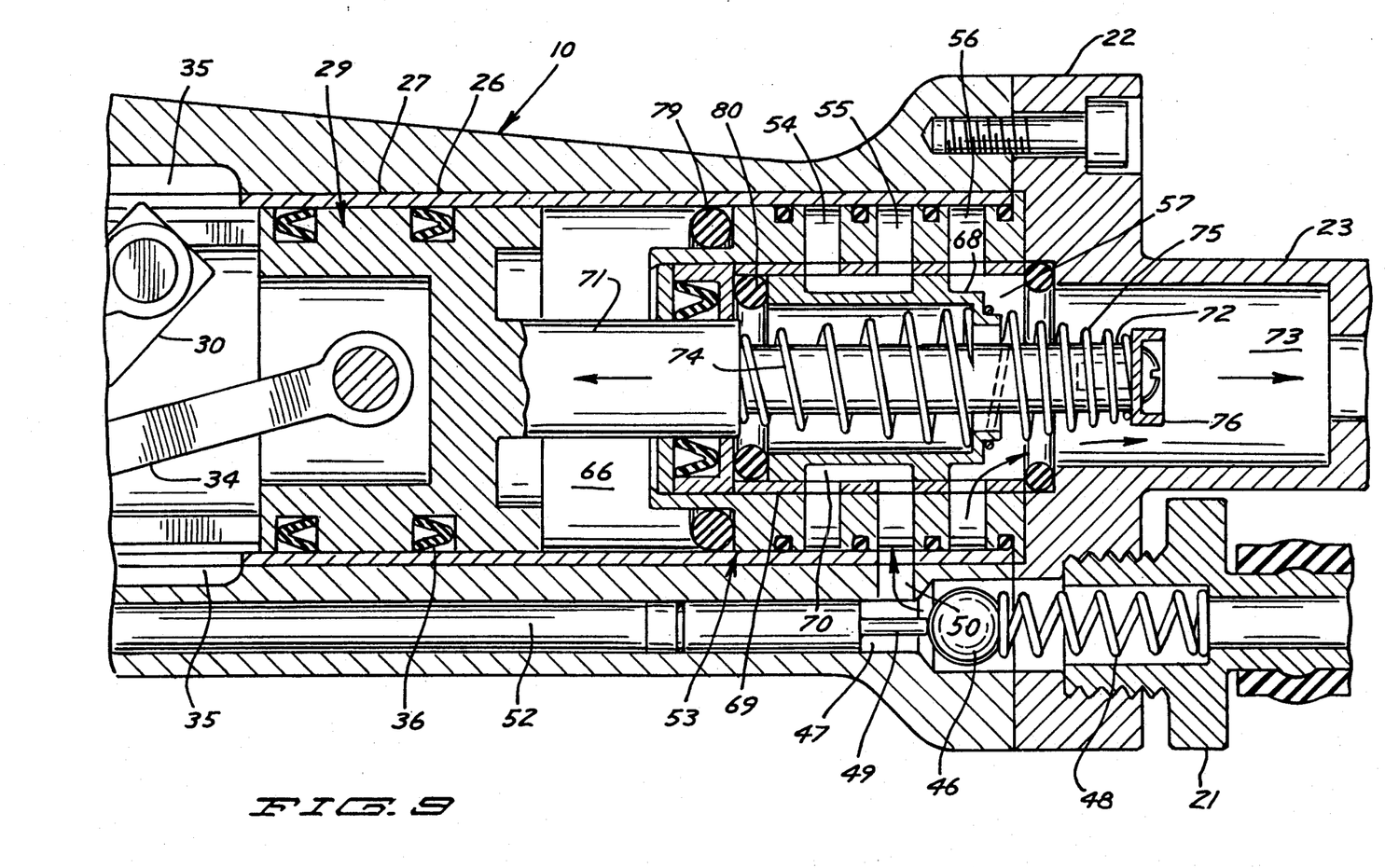
FIG. 9 is a section similar to FIG. 5, on a further enlarged scale, showing details of the control valve and associated structure.
Figure 10:
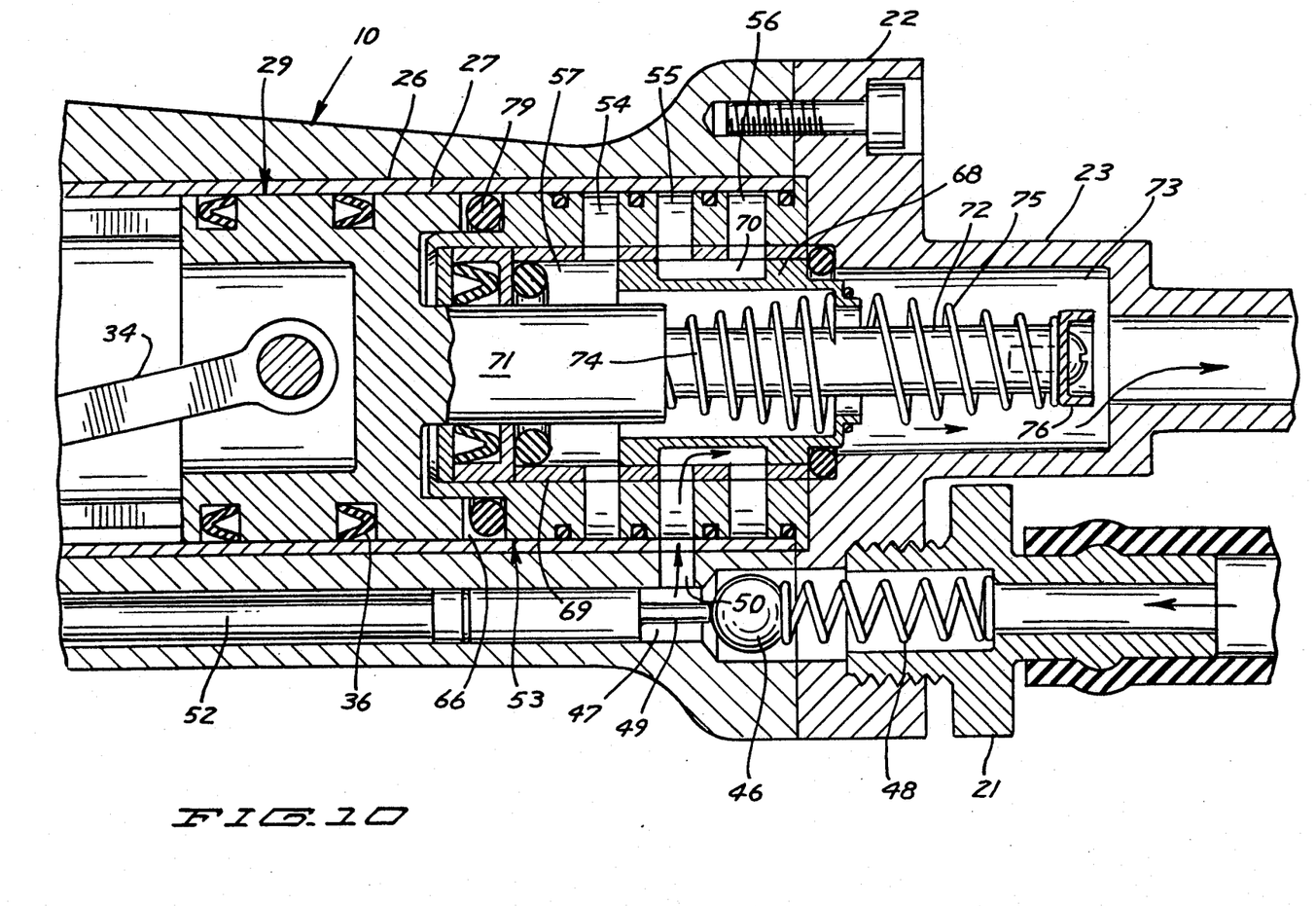
FIG. 10 is a similar sectional view showing the parts in position as in FIG. 7.

As best seen in FIGS. 9 and 10, distribution of the pressurized fluid after it enters the housing is controlled by a shuttle valve, indicated generally at 53. The shuttle valve body comprises four spaced apart disk elements in fixed fluid tight engagement with sleeve 27 and defining three annular passages or channels 54-56, which in turn communicate with a central longitudinal passage 57. The shuttle valve is positioned so that annular passage 55 is in direct fluid communication with fluid inlet port 50. Annular passage 54 communicates with a port 58 to longitudinally extending passage 59 within the handle housing (FIG. 6). Passage 59 extends to a further port 60 which communicates with the chamber 61 between pistons 28 and 29. Annular passage 56 is positioned to communicate with port 62 to longitudinal passage 63 in the handle housing. Passage 63 extends to ports 64 and 65. Port 64 connects with chamber 66 on the back side of piston 29 and port 65 connects with chamber 67 on the front side of piston 28.

Flow of fluid through the shuttle valve is directed by a reciprocable shuttle 68 which is in fluid tight slideable engagement with a sleeve 69 fixed in the annular bore of the shuttle valve body. Sleeve 69 has ports communicating with annular channels 54-56. Shuttle 68 is generally in the form of a spool whose end flanges engage sleeve 69 and define an annular channel 70 which alternately connects annular channels 54 and 55 of the shuttle valve body, as in FIG. 9, or annular channels 55 and 56, as in FIG. 10.

Piston 29 has a rearwardly extending piston rod 71 in fluid tight slideable engagement with shuttle valve 53 and a rearward extension or shuttle rod 72 which extends through the bore of shuttle 68 into chamber 73 in the end cap 22. A first coil spring 74 encircles shuttle rod 72 bearing against the end of piston rod 71 and an internal shoulder at the rearward end shuttle 68. A second coil spring 75 encircles piston rod extension 72 bearing against an external shoulder at the rearward end shuttle 68 and held in place by end cap 76. Springs 74 and 75 are alternately compressed and expanded.

As piston 29 is caused to move rearwardly, force exerted by piston rod 71 causes spring 74 to be compressed and causes shuttle 68 to move from the position of FIG. 9 to the position of FIG. 10. When piston 29 is caused to move in the opposite direction force exerted upon spring 75 by cap 76 causes spring 75 to be compressed and causes the shuttle 68 to return to the position shown in FIG. 9. Springs 74 and 75 allow compliance so that the shuttle 68 moves a lesser distance than does shuttle rod 72. For example, in one embodiment the shuttle moves 0.180 inch while the shuttle rod moves 0.380 inch.

O-ring 77 functions as a resilient shock absorbing bumper between piston 28 and the end of bore 26. O-ring 78 functions as a bumper between the rearward end of piston 28 and the foreward end of piston 29. O-ring 79 functions as a bumper between piston 29 and shuttle valve 53. O-ring 80 functions as a bumper between the shuttle 68 and shuttle valve body.

In the operation of the cutting tool according to the present invention, the operator squeezes trigger 24 to unseat ball valve element 46 permitting entry of fluid under pressure into the housing through port 50. With shuttle 68 in the position shown in FIG. 9 the fluid enters annular channel 55 in the shuttle valve body, passes into annular channel 70 in shuttle 68, and thence through annular channel 54, port 58, passage 59, and port 60 to chamber 61 between pistons 28 and 29. The fluid pressure forces the pistons apart from the position of FIG. 5 to that of FIG. 7. As piston 28 is forwardly the cutting blade 11 is extended. Fluid in the space 67 forward of piston 28 is forced out through port 65 into passage 63. Similarly, fluid in the space 66 behind piston 29 is forced through port 64 into passage 63. The combined fluid is forced out from passage 63 through port 62 into annular channel 56 of the shuttle valve from which it may escape into chamber 73 and be exhausted through exhaust means 23. Where the operating fluid is air, it may be exhausted into the atmosphere or returned for recycling. Where the operating fluid is a liquid, it is returned for recycling.

With pistons 28 and 29 in the position of FIG. 7, shuttle 68 is moved to the position of FIG. 10. Then the continuing flow of fluid under pressure entering through port 50 and annular channel 55 is directed by the shuttle through annular channel 70 into annular channel 56 of the shuttle valve body. From there it is forced through port 62 into passage 63 and ports 64 and 65 into chambers 66 and 67, respectively, behind piston 29 and ahead of piston 28 to cause the pistons to be moved toward one another. The fluid in chamber 61 between the pistons is exhausted through port 60 into passage 59, and through port 58 to annular channel 54, and thence through the central bore of the shuttle to chamber 73 and exhaust. Thereafter the cycle is repeated so long as the operator squeezes trigger 24.

The cutting tool of the present invention is substantially vibration free by virtue of balance between the forward piston 28 and blade mounting assembly, and rearward piston 29, which functions as a counterweight. Because the length and weight of any given cutting blade may vary, compensation must be made for the additional weight of a longer or heavier blade. This is done by removing as much of threaded shank 41 of the blade mounting shaft and extension 42 thereof as may be necessary to achieve the desired balance.

It is apparent that many modifications and variations of this invention as hereinbefore set forth may be made without departing from the spirit and scope thereof. The specific embodiments described are given by way of example only and the invention is limited only by the terms of the appended claims.

I claim as my invention:

1. A fluid powered reciprocating blade cutting tool which comprises:
   A) a hand-grippable elongated hollow handle comprising a motor housing,
   B) a fluid inlet fitting for connecting said housing to a source of fluid under pressure and means for exhausting fluid from said housing,
   C) a reciprocable cutting blade extending forwardly from said handle, said blade and said handle being in longitudinal alignment,
   D) a fluid operated motor within said housing and comprising:
      1) a pair of aligned spaced apart fluid actuated pistons reciprocable in opposite directions, said pistons being in longitudinal alignment with said blade and handle, said blade being secured to the forwardmost of said pistons for linear longitudinal movement due to the linear longitudinal movement of the pistons, and
      2) a control valve and fluid flow passages associated with said fitting for directing fluid alternately to inner and outer sides of said pistons, and
   E) manually operable trigger means supported in the housing and controlling flow of fluid into said housing.

2. A cutting tool according to claim 1 wherein said handle includes a longitudinal cylindrical bore, the cutting blade having a shank, said shank being supported in a rotatable mount within the forward end of said bore, whereby the cutting angle of said blade relative to the handle is variable without necessitating rotation of the user's wrist.

3. A cutting tool according to claim 1 wherein the combined weight of said cutting blade and the forwardmost of said pistons to which the cutting blade is secured is approximately the same as the weight of the other of said pair of pistons.

4. A cutting tool according to claim 1 wherein said pistons are connected by a pivoted linkage.

5. A balanced essentially vibration-free fluid powered reciprocating blade cutting tool which comprises:
   A) a hand-grippable hollow handle comprising a motor housing,
   B) a fluid inlet fitting for connecting said housing to a source of fluid under pressure and means for exhausting fluid from said housing,
   C) a reciprocable cutting blade extending forwardly from said handle, said cutting blade being supported in a rotatable mount whereby the cutting angle of said blade relative to the handle is variable without necessitating rotation of the user's wrist,
   D) a fluid operated motor within said housing and comprising:
      1) a pair of aligned spaced apart pistons reciprocable in opposite directions, said blade being secured to the forwardmost of said pistons, the combined weight of said cutting blade and forwardmost piston being approximately the same as the weight of the other of said pair of pistons,
      2) a pivoted linkage between and connecting said pistons,
      3) a shuttle control valve positioned in the rearward end of said motor housing, and
      4) a first longitudinal fluid flow passage within the housing having ports connecting the body of said shuttle valve and the space between said pair of pistons, and a second longitudinal fluid flow passage having ports connecting said shuttle valve body and the spaces forward of the forwardmost of said pair of pistons and rearward of the rearwardmost of said pair of pistons, said shuttle valve alternately directing fluid under pressure to one of said fluid flow passages, and E) manually operable trigger means supported in the housing and controlling flow of fluid into said housing.

6. A cutting tool according to claim 5 wherein:
A) said housing includes a longitudinal cylindrical bore,
B) said blade mount comprises a cylindrical shaft rotatable within said bore,
C) said cutting blade includes a flat shank supported in a longitudinal slot in said cylindrical shaft,
D) the rearward end of said cylindrical shaft is rotatably connected to the forwardmost of said pair of pistons, and
E) set screw lock means are provided to fix said shaft against rotation to maintain said blade at the desired angle relative to said handle.

7. A cutting tool according to claim 6 wherein:
A) the forwardmost of said pair of pistons includes a forwardly extending internally threaded piston rod,
B) said cylindrical shaft has a rearwardly projecting externally threaded extension engageable with said piston rod, and
C) the length of said threaded extension varies dependent upon the weight of said cutting blade, said extension being shortened by an amount to compensate for the added weight of a heavier blade.

8. A cutting tool according to claim 5 wherein said pivoted linkage comprises:
A) a linkage arm journaled for limited rotation about a transverse shaft supported in the motor housing,
B) a first link pivotally connected at one to one end of said linkage arm and pivotally connected at the other end to the forwardmost of said pair of pistons, and
C) a second link pivotally connected at one end to the opposite end of said linkage arm and pivotally connected at the opposite end to the rearwardmost of said pair of pistons.

9. A cutting tool according to claim 5 wherein:
A) the body of said shuttle valve includes:
  1) an inner longitudinal channel,
  2) a first annular channel connected to the source of fluid under pressure and to said inner longitudinal channel,
  3) a second annular channel connected to said inner longitudinal channel and said first longitudinal fluid flow passage, and
  4) a third annular channel connected to said inner longitudinal channel and said second longitudinal fluid flow passage, and
B) a reciprocable spool shuttle within said inner longitudinal channel for alternately connecting said first and second annular channels and said first and third annular channels.

10. A cutting tool according to claim 9 wherein:
A) said reciprocable shuttle includes a pair of end flanges engageable with the wall of the inner longitudinal channel of the shuttle valve body, and
B) an annular passage between said flanges alternately connects with one pair of the annular channels of the shuttle valve body.

11. A cutting tool according to claim 10 wherein the rearwardmost of said pair of pistons includes a rearwardly extending piston rod in spring biased engagement with said reciprocable shuttle, whereby the shuttle is caused to move with and in the direction of movement of said rearwardmost piston.

12. A fluid powered reciprocating blade cutting tool which comprises:
A) a hand-grippable elongated hollow handle comprising a motor housing, said housing including a longitudinal cylindrical bore,
B) a fluid inlet fitting for connecting said housing to a source of fluid under pressure and means for exhausting fluid from said housing,
C) a reciprocable cutting blade extending forwardly from said handle, said blade and said handle being in longitudinal alignment, said cutting blade including a flat shank supported in a longitudinal slot in a cylindrical shaft rotatable within the cylindrical bore of said housing,
D) a fluid operated motor within said housing and comprising:
  1) a pair of aligned spaced apart pistons reciprocable in opposite directions, the rearward end of said cylindrical shaft being rotatably connected to the forwardmost of said pair of pistons, and lock means provided to fix said shaft against rotation to maintain said blade at any desired angle relative to said handle, and
  2) a control valve and fluid flow passages associated with said fitting for directing fluid alternately to inner and outer sides of said pistons, and
E) manually operable trigger means supported in the housing and controlling flow of fluid into said housing.

13. A cutting tool according to claim 12, wherein said cylindrical blade supporting shaft and said forwardmost piston are rotatably connected by a screw thread connection.

14. A cutting tool according to claim 13 wherein said lock means comprises a radially extending set screw in said handle.

15. A fluid powered reciprocating blade cutting tool which comprises:
A) a hand-grippable elongated hollow handle comprising a motor housing,
B) a fluid inlet fitting for connecting said housing to a source of fluid under pressure and means for exhausting fluid from said housing,
C) a reciprocable cutting blade extending forwardly from said handle, said blade including a flat shank, said blade and said handle being in longitudinal alignment,
D) a fluid operated motor within said housing and comprising:
  1) a pair of aligned spaced apart pistons reciprocable in opposite directions, the forwardmost of said pair of pistons including a forwardly extending internally threaded piston rod, said piston rod engaging a rearwardly projecting externally threaded extension of a cylindrical shaft which has a longitudinal slot therein, the flat shank of said cutting blade being supported in said slot, the combined weight of said cutting blade and the forwardmost of said pistons to which the cutting blade is secured being approximately the same as the weight of the other of said pair of pistons, the length of said threaded extension varying depending upon the weight of said cutting blade, said extension being shortened by an amount to compensate for the added weight of a heavier blade, and 2) a control valve and fluid flow passages associated with said fitting for directing fluid alternately to inner and outer sides of said pistons, and E) manually operable trigger means supported in the housing and controlling flow of fluid into said housing.

16. A fluid powered reciprocating blade cutting tool which comprises:

A) a hand-grippable elongated hollow handle comprising a motor housing,

B) a fluid inlet fitting for connecting said housing to a source of fluid under pressure and means for exhausting fluid from said housing, C) a reciprocable cutting blade extending forwardly from said handle, said blade and said handle being in longitudinal alignment, D) a fluid operated motor within said housing and comprising:

1) a pair of aligned spaced apart pistons reciprocable in opposite directions, said blade being secured to the forwardmost of said pistons, said pistons being connected by a pivoted linkage which comprises:

a) a linkage arm journaled for limited rotation about a transverse shaft supported in the motor housing, b) a first link pivotally connected at one end to one end of said linkage arm and pivotally connected at the other end to the forwardmost of said pair of pistons, and c) a second link pivotally connected at one end to the opposite end of said linkage arm and pivotally connected at the opposite end to the rearwardmost of said pair of pistons, and 2) a control valve and fluid flow passages associated with said fitting for directing fluid alternately to inner and outer sides of said pistons, and E) manually operable trigger means supported in the housing and controlling flow of fluid into said housing.

17. A fluid powered reciprocating blade cutting tool which comprises:

A) a hand-grippable elongated hollow handle comprising a motor housing,

B) a fluid inlet fitting for connecting said housing to a source of fluid under pressure and means for exhausting fluid from said housing, C) a reciprocable cutting blade extending forwardly from said handle, said blade and said handle being in longitudinal alignment, D) a fluid operated motor within said housing and comprising:

1) a pair of aligned spaced apart pistons reciprocable in opposite directions, said blade being secured to the forwardmost of said pistons, 2) a shuttle control valve positioned in the rearward end of said motor housing, 3) a first longitudinal fluid flow passage in said housing, said passage having ports connecting the body of said shuttle valve and the space between said pair of pistons, and a second longitudinal fluid flow passage having ports connecting said shuttle valve body and the spaced forward of the forwardmost of said pair of pistons and rearward of the rearwardmost of said pair of pistons, said passages being associated with said fluid inlet fitting through said shuttle valve, said shuttle valve alternately directing fluid under pressure to one of said fluid flow passages for directing fluid alternately to inner and outer sides of said pistons, and E) manually operable trigger means supported in the housing and controlling flow of fluid into said housing.

18. A cutting tool according to claim 17 wherein:

A) the body of said shuttle valve includes:

1) an inner longitudinal channel, 2) a first annular channel connected to the source of fluid under pressure and to said inner longitudinal channel, 3) a second annular channel connected to said inner longitudinal channel and said first longitudinal passage, and 4) a third annular channel connected to said inner longitudinal channel and said second longitudinal fluid flow passage, and B) a reciprocable spool shuttle within said inner longitudinal channel for alternately connecting said first and second annular channels and said first and third annular channels.

19. A cutting tool according to claim 18 wherein:

A) said reciprocable shuttle includes a pair of end flanges engageable with the wall of the inner longitudinal channel of the shuttle valve body, and B) an annular passage between said flanges alternately connects with one pair of the annular channels of the shuttle valve body.

20. A cutting tool according to claim 19 wherein the rearwardmost of said pair of pistons includes a rearwardly extending piston rod in spring biased engagement with said reciprocable shuttle, whereby the shuttle is caused to move with and in the direction of movement of said rearwardmost piston.

* * * * *

UNITED STATES PATENT AND TRADEMARK OFFICE
CERTIFICATE OF CORRECTION

PATENT NO. : 5,218,767
DATED      : June 15, 1993
INVENTOR(S): ANDREW J. WELLS It is certified that error appears in the above-identified patent and that said Letters Patent is hereby corrected as shown below:

```
Col. 4, line 54, after "end" insert ---of---.

Col. 4, line 56, after "end" insert ---of---.

Col. 5, line 20, after "is" insert ---moved---.

Col. 8, line 67, "depending" should be ---dependent---.
```

Signed and Sealed this

Twenty-ninth Day of March, 1994

Attest:

BRUCE LEHMAN

*Attesting Officer*   Commissioner of Patents and Trademarks